United States Patent
Desai et al.

(10) Patent No.: US 9,509,638 B2
(45) Date of Patent: *Nov. 29, 2016

(54) HETEROGENEOUS MEDIA PACKET BRIDGING

(71) Applicant: Fortinet, Inc., Sunnyvale, CA (US)

(72) Inventors: Sachin Desai, Santa Clara, CA (US); Rajesh Balay, Cupertino, CA (US); Chandramouli Sargor, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,995

(22) Filed: Mar. 16, 2016

(65) Prior Publication Data

US 2016/0197855 A1    Jul. 7, 2016

Related U.S. Application Data

(63) Continuation of application No. 14/587,959, filed on Dec. 31, 2014, now Pat. No. 9,331,961, which is a continuation of application No. 13/959,103, filed on Aug. 5, 2013, now Pat. No. 9,185,050, which is a (Continued)

(51) Int. Cl.
*H04L 12/947* (2013.01)
*H04L 12/931* (2013.01)
*H04L 12/46* (2006.01)

(52) U.S. Cl.
CPC .............. *H04L 49/25* (2013.01); *H04L 12/46* (2013.01); *H04L 12/4625* (2013.01); *H04L 49/354* (2013.01)

(58) Field of Classification Search
CPC ... H04L 12/46; H04L 12/4625; H04L 49/25; H04L 49/354
See application file for complete search history.

(56) References Cited

U.S. PATENT DOCUMENTS

| 4,667,287 A | 5/1987 | Allen |
|---|---|---|
| 5,201,049 A | 4/1993 | Shorter |

(Continued)

FOREIGN PATENT DOCUMENTS

| EP | 1050181 | 11/2007 |
|---|---|---|
| WO | 0015290 | 8/2000 |

(Continued)

OTHER PUBLICATIONS

Notice of Allowance for U.S. Appl. No. 15/008,270 mailed May 18, 2016. (714).

(Continued)

*Primary Examiner* — David Oveissi
(74) *Attorney, Agent, or Firm* — Hamilton, DeSanctis & Cha LLP

(57) ABSTRACT

Methods and systems for bridging network packets transmitted over heterogeneous media channels are provided. According to one embodiment, a network switching/routing blade server comprises network modules, including a first and second set operable to receive packets having a first and second framing media format, respectively. A single bridging domain is provided by a shared bridging application. A memory stores data structures for translating between the first and second framing media formats via an intermediate format. The netmods pass a received packet, through a switching fabric, to the bridging application, which determines a relay location for the packet and whether the relay location is among the other set of netmods. Responsive to an affirmative determination, the bridging application uses the translation data structures to translate the packet before relaying the packet to the relay location.

13 Claims, 4 Drawing Sheets

Related U.S. Application Data continuation of application No. 13/154,330, filed on Jun. 6, 2011, now Pat. No. 8,503,463, which is a continuation of application No. 12/781,807, filed on May 17, 2010, now Pat. No. 7,957,407, which is a continuation of application No. 10/650,298, filed on Aug. 27, 2003, now Pat. No. 7,720,095.

(56) References Cited

U.S. PATENT DOCUMENTS

| | | |
|---|---|---|
| 5,400,331 A | 3/1995 | Lucak et al. |
| 5,442,708 A | 8/1995 | Adams |
| 5,473,599 A | 12/1995 | Li et al. |
| 5,490,252 A | 2/1996 | Macera et al. |
| 5,581,705 A | 12/1996 | Passint et al. |
| 5,606,668 A | 2/1997 | Shwed |
| 5,633,866 A | 5/1997 | Callon |
| 5,745,778 A | 4/1998 | Alfieri |
| 5,812,779 A | 9/1998 | Ciscon et al. |
| 5,825,772 A | 10/1998 | Dobbins et al. |
| 5,825,891 A | 10/1998 | Levesque et al. |
| 5,835,726 A | 11/1998 | Shwed et al. |
| 5,841,973 A | 11/1998 | Kessler et al. |
| 5,841,990 A | 11/1998 | Picazo et al. |
| 5,875,290 A | 2/1999 | Bartfait et al. |
| 5,963,555 A | 10/1999 | Takase et al. |
| 5,964,847 A | 10/1999 | Booth et al. |
| 5,987,521 A | 11/1999 | Arrowood et al. |
| 6,014,382 A | 1/2000 | Takihiro et al. |
| 6,032,193 A | 2/2000 | Sullivan |
| 6,047,330 A | 4/2000 | Stracke, Jr. |
| 6,058,429 A | 5/2000 | Ames et al. |
| 6,069,895 A | 5/2000 | Ayandeh |
| 6,085,238 A | 7/2000 | Yuasa et al. |
| 6,098,110 A | 8/2000 | Witkowski et al. |
| 6,118,791 A | 9/2000 | Fichou et al. |
| 6,134,226 A | 10/2000 | Reed et al. |
| 6,137,777 A | 10/2000 | Vaid et al. |
| 6,147,970 A | 11/2000 | Troxel |
| 6,147,976 A | 11/2000 | Shand et al. |
| 6,169,739 B1 | 1/2001 | Isoyama |
| 6,169,793 B1 | 1/2001 | Gowdin et al. |
| 6,172,980 B1 | 1/2001 | Flanders et al. |
| 6,172,991 B1 | 1/2001 | Mori |
| 6,173,333 B1 | 1/2001 | Jolitz et al. |
| 6,175,867 B1 | 1/2001 | Taghadoss |
| 6,192,051 B1 | 2/2001 | Lipman et al. |
| 6,220,768 B1 | 4/2001 | Barroux |
| 6,226,296 B1 | 5/2001 | Lindsey et al. |
| 6,226,788 B1 | 5/2001 | Schoening et al. |
| 6,243,580 B1 | 6/2001 | Garner |
| 6,249,519 B1 | 6/2001 | Rangachar |
| 6,260,072 B1 | 7/2001 | Rodriguez |
| 6,260,073 B1 | 7/2001 | Walker et al. |
| 6,266,695 B1 | 7/2001 | Huang et al. |
| 6,286,038 B1 | 9/2001 | Reichmeyer et al. |
| 6,295,297 B1 | 9/2001 | Lee |
| 6,298,130 B1 | 10/2001 | Galvin |
| 6,304,975 B1 | 10/2001 | Shipley |
| 6,320,859 B1 | 11/2001 | Momirov |
| 6,330,602 B1 | 12/2001 | Law et al. |
| 6,338,092 B1 | 1/2002 | Chao et al. |
| 6,381,644 B2 | 4/2002 | Munguia et al. |
| 6,405,262 B1 | 6/2002 | Vogel et al. |
| 6,414,595 B1 | 7/2002 | Scrandis et al. |
| 6,430,184 B1 | 8/2002 | Robins et al. |
| 6,434,619 B1 | 8/2002 | Lim et al. |
| 6,438,612 B1 | 8/2002 | Ylonen et al. |
| 6,449,650 B1 | 9/2002 | Westfall et al. |
| 6,453,406 B1 | 9/2002 | Samikowski et al. |
| 6,459,682 B1 | 10/2002 | Ellesson et al. |
| 6,463,061 B1 | 10/2002 | Rekhter et al. |
| 6,466,976 B1 | 10/2002 | Alles et al. |
| 6,496,935 B1 | 12/2002 | Fink et al. |
| 6,532,088 B1 | 3/2003 | Dantu et al. |
| 6,542,466 B1 | 4/2003 | Pashtan et al. |
| 6,556,544 B1 | 4/2003 | Lee |
| 6,556,547 B1 | 4/2003 | Srikanth et al. |
| 6,606,315 B1 | 8/2003 | Albert et al. |
| 6,608,816 B1 | 8/2003 | Nichols |
| 6,609,153 B1 | 8/2003 | Salkewicz |
| 6,614,792 B1 | 9/2003 | Pazy et al. |
| 6,625,156 B2 | 9/2003 | Shaio et al. |
| 6,625,169 B1 | 9/2003 | Tofano |
| 6,631,519 B1 | 10/2003 | Nicholson et al. |
| 6,636,516 B1 | 10/2003 | Yamano |
| 6,639,897 B1 | 10/2003 | Shiomoto et al. |
| 6,658,013 B1 | 12/2003 | de Boer et al. |
| 6,665,725 B1 | 12/2003 | Dietz et al. |
| 6,668,282 B1 | 12/2003 | Booth et al. |
| 6,674,756 B1 | 1/2004 | Rao et al. |
| 6,687,220 B1 | 2/2004 | Ayres |
| 6,697,359 B1 | 2/2004 | George |
| 6,697,360 B1 | 2/2004 | Gai et al. |
| 6,704,318 B1 | 3/2004 | Stuart et al. |
| 6,738,371 B1 | 5/2004 | Ayres |
| 6,754,662 B1 | 6/2004 | Li |
| 6,775,267 B1 | 8/2004 | Kung et al. |
| 6,775,284 B1 | 8/2004 | Calvignac et al. |
| 6,816,462 B1 | 11/2004 | Booth et al. |
| 6,850,531 B1 | 2/2005 | Rao et al. |
| 6,856,676 B1 | 2/2005 | Pirot et al. |
| 6,862,279 B1 | 3/2005 | Imai et al. |
| 6,868,082 B1 | 3/2005 | Allen et al. |
| 6,883,170 B1 | 4/2005 | Garcia |
| 6,892,237 B1 | 5/2005 | Gai et al. |
| 6,901,517 B1 | 5/2005 | Redmore |
| 6,914,907 B1 | 7/2005 | Bhardwaj et al. |
| 6,931,452 B1 | 8/2005 | Lamberton et al. |
| 6,938,095 B2 | 8/2005 | Basturk et al. |
| 6,938,097 B1 | 8/2005 | Vincent et al. |
| 6,944,128 B2 | 9/2005 | Nichols |
| 6,944,168 B2 | 9/2005 | Paatela et al. |
| 6,954,429 B2 | 10/2005 | Horton et al. |
| 6,982,984 B1 | 1/2006 | Asayesh et al. |
| 6,985,438 B1 | 1/2006 | Tschudin |
| 6,990,103 B1 | 1/2006 | Gollamudi |
| 6,999,454 B1 | 2/2006 | Crump |
| 7,002,965 B1 | 2/2006 | Cheriton |
| 7,003,581 B1 | 2/2006 | Lamberton et al. |
| 7,012,919 B1 | 3/2006 | So et al. |
| 7,020,143 B2 | 3/2006 | Zdan |
| 7,039,053 B1 | 5/2006 | Freed et al. |
| 7,042,843 B2 | 5/2006 | Ni |
| 7,042,848 B2 | 5/2006 | Santiago et al. |
| 7,062,570 B2 | 6/2006 | Hong et al. |
| 7,068,656 B2 | 6/2006 | Sainomoto et al. |
| 7,096,383 B2 | 8/2006 | Talaugon et al. |
| 7,116,665 B2 | 10/2006 | Balay et al. |
| 7,116,679 B1 | 10/2006 | Ghahremani |
| 7,136,351 B2 | 11/2006 | Metin et al. |
| 7,139,271 B1 | 11/2006 | Parruck et al. |
| 7,161,904 B2 | 1/2007 | Hussain et al. |
| 7,177,311 B1 | 2/2007 | Hussain et al. |
| 7,197,553 B2 | 3/2007 | Roberts et al. |
| 7,203,192 B2 | 4/2007 | Desai et al. |
| 7,263,091 B1 | 8/2007 | Woo et al. |
| 7,266,120 B2 | 9/2007 | Cheng et al. |
| 7,269,157 B2 | 9/2007 | Klinker et al. |
| 7,272,643 B1 | 9/2007 | Sarkar et al. |
| 7,278,055 B2 | 10/2007 | Talaugon et al. |
| 7,340,535 B1 | 3/2008 | Alam |
| 7,359,404 B1 | 4/2008 | Allan |
| 7,376,125 B1 | 5/2008 | Hussain et al. |
| 7,386,010 B2 | 6/2008 | Solomon et al. |
| 7,444,398 B1 | 10/2008 | Matthews |
| 7,499,398 B2 | 3/2009 | Damon et al. |
| 7,522,604 B2 | 4/2009 | Hussain et al. |
| 7,574,495 B1 | 8/2009 | Rajagopalan |
| 7,587,633 B2 | 9/2009 | Talaugon et al. |
| 7,639,632 B2 | 12/2009 | Sarkar et al. |
| 7,668,087 B2 | 2/2010 | Hussain et al. |
| 7,720,053 B2 | 5/2010 | Hussain et al. |
| 7,720,095 B2 | 5/2010 | Desai et al. |

(56) References Cited

U.S. PATENT DOCUMENTS

| | | |
|---|---|---|
| 7,746,873 B2 | 6/2010 | Saito et al. |
| 7,801,155 B2 | 9/2010 | Wang |
| 7,830,787 B1 | 11/2010 | Wijnands et al. |
| 7,957,407 B2 | 6/2011 | Desai et al. |
| 8,064,462 B2 | 11/2011 | Hussain et al. |
| 8,068,503 B2 | 11/2011 | Desai et al. |
| 8,085,776 B2 | 12/2011 | Balay et al. |
| 8,111,690 B2 | 2/2012 | Hussain et al. |
| 8,306,040 B2 | 11/2012 | Desai et al. |
| 8,503,463 B2 | 8/2013 | Desai et al. |
| 8,542,595 B2 | 9/2013 | Hussain et al. |
| 8,638,802 B2 | 1/2014 | Desai et al. |
| 8,848,718 B2 | 9/2014 | Hussain et al. |
| 9,019,833 B2 | 4/2015 | Hussain et al. |
| 9,124,555 B2 | 9/2015 | Chih-Tiang |
| 9,143,351 B2 | 9/2015 | Millet |
| 9,160,716 B2 | 10/2015 | Sun et al. |
| 9,185,050 B2 | 11/2015 | Desai et al. |
| 9,331,961 B2 | 5/2016 | Desai et al. |
| 2001/0000194 A1 | 4/2001 | Sequeira |
| 2001/0033580 A1 | 10/2001 | Dorsey et al. |
| 2001/0043571 A1 | 11/2001 | Jang et al. |
| 2001/0048661 A1 | 12/2001 | Clear et al. |
| 2001/0052013 A1 | 12/2001 | Munguia et al. |
| 2002/0049902 A1 | 4/2002 | Rhodes |
| 2002/0062344 A1 | 5/2002 | Ylonen et al. |
| 2002/0066034 A1 | 5/2002 | Schlossberg et al. |
| 2002/0075901 A1 | 6/2002 | Perlmutter et al. |
| 2002/0097730 A1 | 7/2002 | Langille et al. |
| 2002/0097872 A1 | 7/2002 | Barbas et al. |
| 2002/0099849 A1 | 7/2002 | Alfieri et al. |
| 2002/0116501 A1 | 8/2002 | Ho et al. |
| 2002/0116529 A1 | 8/2002 | Hayden |
| 2002/0120720 A1 | 8/2002 | Moir |
| 2002/0126671 A1 | 9/2002 | Ellis et al. |
| 2002/0126672 A1 | 9/2002 | Chow et al. |
| 2002/0145981 A1 | 10/2002 | Klinker et al. |
| 2002/0150114 A1 | 10/2002 | Sainomoto et al. |
| 2002/0152373 A1 | 10/2002 | Sun et al. |
| 2002/0184387 A1 | 12/2002 | Yamaya et al. |
| 2002/0186661 A1 | 12/2002 | Santiago et al. |
| 2002/0188657 A1 | 12/2002 | Travesat et al. |
| 2002/0191604 A1 | 12/2002 | Mitchell et al. |
| 2002/0194378 A1 | 12/2002 | Foti |
| 2003/0026262 A1 | 2/2003 | Jarl |
| 2003/0033401 A1 | 2/2003 | Poisson et al. |
| 2003/0043792 A1 | 3/2003 | Carpini et al. |
| 2003/0051048 A1 | 3/2003 | Watson et al. |
| 2003/0055920 A1 | 3/2003 | Kakadia et al. |
| 2003/0063348 A1 | 4/2003 | Posey |
| 2003/0074388 A1 | 4/2003 | Pham et al. |
| 2003/0074473 A1 | 4/2003 | Pham et al. |
| 2003/0076838 A1 | 4/2003 | Shaio et al. |
| 2003/0081559 A1 | 5/2003 | Matuoka |
| 2003/0084219 A1 | 5/2003 | Yao et al. |
| 2003/0091021 A1 | 5/2003 | Trossen et al. |
| 2003/0093557 A1 | 5/2003 | Giraud et al. |
| 2003/0108041 A1 | 6/2003 | Aysan et al. |
| 2003/0112799 A1 | 6/2003 | Chandra et al. |
| 2003/0115308 A1 | 6/2003 | Best et al. |
| 2003/0117954 A1 | 6/2003 | De Neve et al. |
| 2003/0131228 A1 | 7/2003 | Twomey |
| 2003/0169747 A1 | 9/2003 | Wang |
| 2003/0174650 A1 | 9/2003 | Shankar et al. |
| 2003/0185221 A1 | 10/2003 | Deikman et al. |
| 2003/0185226 A1 | 10/2003 | Tang et al. |
| 2003/0200295 A1 | 10/2003 | Roberts et al. |
| 2003/0212735 A1 | 11/2003 | Hicok et al. |
| 2003/0223361 A1 | 12/2003 | Hussain et al. |
| 2003/0223406 A1 | 12/2003 | Balay et al. |
| 2003/0223418 A1 | 12/2003 | Desai et al. |
| 2003/0223456 A1 | 12/2003 | DiMambro |
| 2004/0037279 A1* | 2/2004 | Zelig .................. H04L 12/1836 370/390 |
| 2004/0042416 A1 | 3/2004 | Ngo et al. |
| 2004/0095934 A1 | 5/2004 | Cheng et al. |
| 2004/0160900 A1 | 8/2004 | Lund et al. |
| 2004/0199567 A1 | 10/2004 | Lund |
| 2004/0199568 A1 | 10/2004 | Lund |
| 2004/0199569 A1 | 10/2004 | Kalkunte et al. |
| 2005/0002417 A1 | 1/2005 | Kelly et al. |
| 2005/0018609 A1 | 1/2005 | Dally et al. |
| 2005/0047407 A1 | 3/2005 | Desai et al. |
| 2005/0188106 A1 | 8/2005 | Pirbhai et al. |
| 2006/0087969 A1 | 4/2006 | Santiago et al. |
| 2006/0140185 A1 | 6/2006 | Norman et al. |
| 2007/0064704 A1 | 3/2007 | Balay et al. |
| 2007/0109968 A1 | 5/2007 | Hussain et al. |
| 2007/0127382 A1 | 6/2007 | Hussain et al. |
| 2007/0147368 A1 | 6/2007 | Desai et al. |
| 2007/0237172 A1 | 10/2007 | Zelig et al. |
| 2007/0291755 A1 | 12/2007 | Cheng et al. |
| 2008/0025214 A1 | 1/2008 | Bettink et al. |
| 2008/0028456 A1 | 1/2008 | O'Rourke et al. |
| 2008/0043764 A1 | 2/2008 | Ishizaki et al. |
| 2008/0049760 A1 | 2/2008 | Bergeron |
| 2008/0112318 A1 | 5/2008 | Groleau et al. |
| 2008/0259936 A1 | 10/2008 | Hussain et al. |
| 2009/0046728 A1 | 2/2009 | Matthews |
| 2009/0073977 A1 | 3/2009 | Hussain et al. |
| 2009/0225759 A1 | 9/2009 | Hussain et al. |
| 2009/0238181 A1 | 9/2009 | Desai et al. |
| 2010/0011245 A1 | 1/2010 | Talaugon et al. |
| 2010/0220732 A1 | 9/2010 | Hussain et al. |
| 2010/0220741 A1 | 9/2010 | Desai et al. |
| 2011/0235649 A1 | 9/2011 | Desai et al. |
| 2012/0057460 A1 | 3/2012 | Hussain et al. |
| 2012/0069850 A1 | 3/2012 | Desai et al. |
| 2012/0099596 A1 | 4/2012 | Balay et al. |
| 2013/0297768 A1 | 11/2013 | Singh |
| 2013/0308460 A1 | 11/2013 | Hussain et al. |
| 2013/0315232 A1 | 11/2013 | Desai et al. |
| 2015/0146730 A1 | 5/2015 | Desai et al. |
| 2015/0195098 A1 | 7/2015 | Cheng et al. |
| 2015/0229567 A1 | 8/2015 | Hussain et al. |
| 2016/0142384 A1 | 5/2016 | Sun |

FOREIGN PATENT DOCUMENTS

| | | |
|---|---|---|
| WO | 0076152 | 12/2000 |
| WO | 0163809 | 8/2001 |
| WO | 0223855 | 3/2002 |
| WO | 03103237 | 12/2003 |

OTHER PUBLICATIONS

Notice of Allowance for U.S. Appl. No. 13/959,103 mailed Sep. 26, 2014.

Non-Final Rejection for U.S. Appl. No. 13/959,103 mailed Aug. 19, 2014.

Non-Final Rejection for U.S. Appl. No. 13/154,330 mailed Mar. 27, 2013.

Notice of Allowance for U.S. Appl. No. 12/781,807 mailed Apr. 29, 2011.

Non-Final Rejection for U.S Appl. No. 12/781,807 mailed Nov. 15, 2010.

Non-Final Rejection for U.S. Appl. No. 10/650,298 mailed Dec. 31, 2009.

Non-Final Rejection for U.S. Appl. No. 10/650,298 mailed Aug. 22, 2007.

Final Rejection for U.S. Appl. No. 10/650,298 mailed Sep. 3, 2008.

Notice of Allowance or U.S. Appl. No. 10/650,298 mailed Apr. 5, 2010.

Rao, J.R., Intranets and VPNs: Strategic Approach. 1988 Annual Review of Communications. 1998. pp. 669-674.

Non-Final Rejection for U.S. Appl. No. 13/154,330 mailed May 31, 2013.

Non-Final Rejection for U.S. Appl. No. 14/587,959 mailed Feb. 2, 2016.

Knight et al. "Virtual Router Redundancy Protocol." RFC 2338. Apr. 1998. 27 pgs.

(56) References Cited

OTHER PUBLICATIONS

European Search Report for PCT/US03/37009 (Jul. 4, 2004) 2 pgs.
International Search Report for PCT/US03/17674. 6 pgs.
Decasper, D. et al., "Router Plugins: A Software Architecture for Next-Generation Routers." IEEE/ACM Transactions on Networking. vol. 8, No. 1. Feb. 2000. 15 pgs.
Spalink, T. et al., "Building a Robust Software-Based Router Using Network Processors." 216-229.
Zhang, et al. "Token Ring Arbitration Circuits for Dynamic Priority Algorithms." IEEE, 1995, pp. 74-77.
Tanenbaum, A.S., "Computer Networks." Upper Saddle River, N.J.: Prentice Hall PTR, 3rd Edition. 1996. pp. 348-364.
Kim, E.C. et al., "The Multi-Layer VPN Management Architecture." Proc. Sixth IFIP/IEEE International Symposium on Integrated Network Management. May 1999. pp. 187-200.
Keshav, S., "An Engineering Approach to Computer Networking: ATM networks, the internet, and the telephone network." Reading Mass: Addison-Wesley, Addison-Wesley Professional Computing Series. 1992.
Hanaki, M. et al., "LAN/WAN management integration using ATM CNM interface." IEEE Network Operations Management Symposium, vol. 1. Apr. 1996. pp. 12-21.
Chan, Mun C. et al "Customer Management and Control of Broadband VPN Services." Proc. Fifth IFIP/IEEE International Symposium of Integrated Network Management. May 1997. pp. 301-314.
Chan, Mun C. et al., "An architecture for broadband virtual networks under customer control." IEEE Network Operations and Management Symposium. Apr. 1996. pp. 135-144.
Gasparro, D.M., "Next-Gen VPNs: The Design Challenge." Data Communications. Sep. 1999. pp. 83-95.
Kapustka, S., "CoSine Communications Move VPNs 'Into the Cloud' with the Leading Managed IP Service Delivery Platform." http://wwwcosinecom.com/news/pr_5_24.html. Press Release, CoSine Communications. 1995. p. 6.

\* cited by examiner image# HETEROGENEOUS MEDIA PACKET BRIDGING

CROSS-REFERENCE TO RELATED APPLICATIONS

This application is a continuation of U.S. patent application Ser. No. 14/587,959, filed on Dec. 31, 2014, now U.S. Pat. No. 9,331,961, which is a continuation of U.S. patent application Ser. No. 13/959,103, filed on Aug. 5, 2013, now U.S. Pat. No. 9,185,050, which is a continuation of U.S. patent application Ser. No. 13/154,330, filed on Jun. 6, 2011, now U.S. Pat. No. 8,503,463, which is a continuation of U.S. patent application Ser. No. 12/781,807, filed on May 17, 2010, now U.S. Pat. No. 7,957,407, which is a continuation of U.S. patent application Ser. No. 10/650,298, filed on Aug. 27, 2003, now U.S. Pat. No. 7,720,095, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2003-2016, Fortinet, Inc.

BACKGROUND

Field

Embodiments of the present invention generally relate to media packet bridging, and more particularly to bridging heterogeneous media packets received from network interfaces from a processing resource.

Description of the Related Art

Ethernet Local Area Networks (LANs) are used to connect multiple computing devices to a network. Generally a LAN configuration is sufficient when the number of computing devices (e.g., computers, appliances, peripherals) communication with one another is relatively small. However, when the number of computing devices increase, multiple networks or network segments will require interconnection. There are a variety of techniques for connecting multiple network segments. One of the easiest and oldest techniques for connecting multiple network segments is using an Ethernet Bridge. Ethernet bridges have multiple Ethernet Network Interfaces, which connect to networks that require a bridge.

Apart from being able to interconnect Ethernet Networks, bridges can also help with segregating network traffic. For example, in an enterprise with 5 departments having 25 computing devices each, on a separate segment is a simple way of connecting all 25 computing devices to a single LAN. While this technique will work, the technique has some obvious disadvantages, since computing devices associated with one department of the enterprise will be disrupted when two computing devices from another department communicate with one another. Thus, a more efficient network design for enterprise is to have a separate LAN for each separate department, where each separate LAN is interconnected with a bridge. In this way, all intra-department traffic will not be present to disrupt other traffic. Moreover, only inter-department traffic will be present on the bridge.

As previously discussed, Ethernet bridges are one of the oldest techniques for interconnecting LANs. Since the inception of Ethernet bridges, they have been enhanced to serve a variety of needs. Once such need relates to connecting (e.g., bridging) multiple LANs that are not in geographic proximity to one another. In these circumstances, Ethernet is transmitted on top of a different framing media (e.g., Asynchronous Transfer Mode (ATM), Gigabit Ethernet (GigE), Frame Relay (FR), Time-Division Multiplexing (TDM), and others). This creates an enhanced bridge with different framing media to external networks.

The enhanced bridge is capable of peeling off the framing headers to detect the Ethernet packet and then performing standard Ethernet bridging operations as if the data were received from a standard LAN interface. This type of enhanced Ethernet Bridge is widely implemented in enterprises with large network branches that are geographically dispersed in order to interconnect the LANs associated with the network branches.

There are a number of conventional products that perform Ethernet bridging over Ethernet media, Ethernet bridging over FR media, Ethernet bridging over ATM media, and the like. However, these conventional products do not permit media agnostic Ethernet bridging. In other words, conventional approaches use a separate and often hardwired network resource that communicates with a specific network interface media. Each network resource is dedicated to a network interface in order to provide Ethernet bridging for a specific media type (e.g., ATM, GigE, FR, TDM, and others) handled by the network interface.

By dedicating network resources to specific network interfaces, an enterprise's heterogeneous networks are not efficiently and flexibly interconnected. Many times the dedicated resources are the result of an enterprise gradually growing its networks, with a later decision to bring the networks together. Alternatively, enterprises can merge previously disconnected departmental networks, or merge with other enterprise networks, and there exist a desire to interconnect the heterogeneous networks. Yet, with conventional approaches the bridging domains for each disparate network are isolated using separate network resources. As one of ordinary skill in the art appreciates, this can be expensive, inflexible, and time consuming for an enterprise to implement.

Therefore, there exist a need for techniques that provide improved heterogeneous network bridging, which are media agnostic. Thus, network resources need not be hardwired or dedicated to a single network interface, and a single bridging domain can be used to bridge all media transmissions.

SUMMARY

Methods and systems are described for bridging network packets transmitted over heterogeneous media channels. According to one embodiment, a network switching/routing blade server comprises multiple network modules, including a first set of network modules operable to receive network packets having a first framing media format of multiple framing media formats and a second set of network modules operable to transmit network packets having a second framing media format of the multiple framing media formats. Multiple processing resources coupled to the network modules and shared by the network modules include a first processing resource upon which a virtual bridging application executes. The virtual bridging application represents a single bridging domain for all network packets received by the network switching/routing blade server. A non-transitory memory, accessible to the first processing resource, stores therein one or more translation data structures defining translations between the first framing media format and an intermediate format and between the intermediate format and the second framing media format. A switching fabric, coupled to the network modules, forwards the network packets received from the first set of network modules to a processing resource. Responsive to receiving a network packet, the first set of network modules pass the network packet to the virtual bridging application through the switching fabric. The virtual bridging application determines a relay location to which the network packet is to be relayed and whether the relay location is among the second set of network modules, which are associated with a disparate framing media format and a disparate media channel than that of the first set of network modules. Responsive to an affirmative determination that the relay location is among the second set of network modules, the virtual bridging application uses the one or more translation data structures to translate the network packet to the second framing media format before relaying the network packet to the relay location.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for bridging network packets transmitted over heterogeneous media channels. In the following detailed description of various embodiments of the present invention, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

As used herein, a "network interface" or a "network media interface" (netmods) is a hardware and software-computing device that connects to telecommunications lines associated with network feeds. Netmods are well known to one of ordinary skill in the art. Netmods come in a variety of configurations and are usually distinguished by the number of telecommunication lines that can physically connect to line interface ports of the netmod.

Netmods include firmware and software to process raw packet data being received on a line interface port. Furthermore, some software instructions are processed within a volatile memory of the netmods. For example, some software instructions permit the recognition of separation of network data packets from a data stream being received over a line interface port. Additionally, software instructions can assign and regulate priorities to data packets being sent from the netmods back over a line interface port.

In various embodiments of the present invention, conventional netmods are used to achieve the teachings of the present invention. The netmods are also connected on the backend (e.g., the side opposite the network feed) to a switching fabric that is used to forward a network packet received from the netmod to one or more processing resources. The processing resources include one or more processing elements and memory. Additionally, the processing resources include applications that are used to translate, encrypt/decrypt, authenticate, forward and/or route any network packets received from the switching fabric.

In one embodiment of the present invention, a plurality of netmods, a switching fabric, and a plurality of processing resources are assembled as a network routing/switching device, such as a blade server. The blade server is configured and distributed by Cosine Communications, Inc. of Redwood City, Calif. The blade server can be assembled with a plurality of additional blade servers that interface with one another. Moreover, IPNOS product offerings, distributed by Cosine Communications, Inc. of Redwood City, Calif. can be modified to embody the teachings of the present disclosure. Of course as one of ordinary skill in the art readily appreciates, any hardware, firmware, and/or software configurations/products that are designed to achieve the tenets of the present disclosure can be used. Thus, all such configurations/products are intended to fall within the scope of the present invention.

Figure 1:
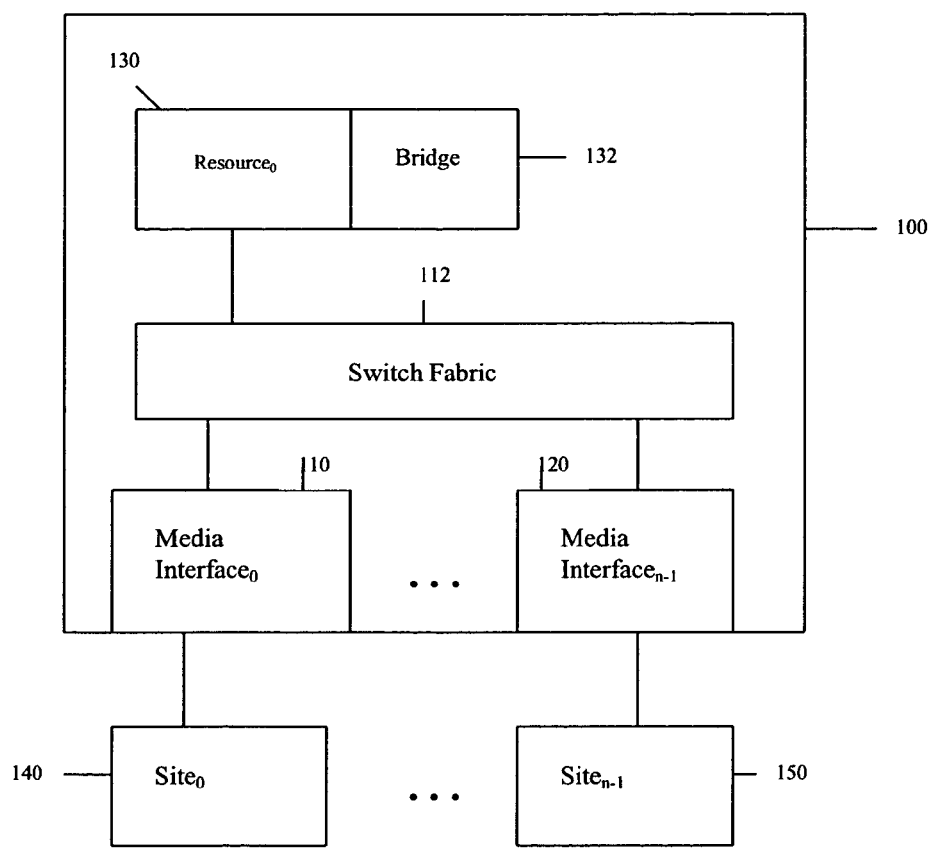
FIG. 1 shows a diagram of a network packet media bridging system, according to the present invention.

FIG. 1 illustrates a diagram of a network packet media bridging system 100, according to the present invention. The bridging system 100 includes a plurality of netmods (e.g., 110 and 120), a switching fabric 112, and a processing resource 130. The processing resource 130 includes a bridging application 132 executing on or accessible to the processing resource 130. The netmods (e.g., 110 and 120) are connected to telecommunication lines associated with other networks (e.g., 140 and 150). Connections to the telecommunications lines are made via line interface ports included within the netmods (e.g., 110 and 120).

The netmods (e.g., 110 and 120) include memory and processing elements for receiving network packets from the line interface ports or for sending network packets out over the line interface ports. In some cases, the memory included within the netmods (e.g., 110 and 120) is Static Random Access Memory (SRAM), which is volatile memory permitting fast access to data. Moreover, the netmods (e.g., 110 and 120) are associated with a specific type of media transmission channel (e.g., ATM, GigE, TDM, FR, and the like). Additionally, a netmod (e.g., 110 or 120) can be wireless. Thus, network netmods (e.g., 110 and 120) need not be physically connected to a telecommunications line, but, rather, can be a transceiver for transmitting and receiving wireless (e.g., Radio Frequency (RF), Infrared (IR), Satellite, and the like) network packets.

The switching fabric 112 is hardware, firmware, and, in some instances, software instructions that receive forwarded network data packets from the netmods (e.g., 110 and 120) and rapidly transfer the packet to the processing resource 130. Conventionally, switching fabric is hardwired from a specific netmod to a specific processing resource for each disparate media transmission (e.g., ATM, GigE, TDM, FR, wireless, and the like). The switching fabric 112 can also receive network packets from the processing resource 130 and forward the network packets along to the appropriate netmod (e.g., 110 and 120).

A number of applications executing on the processing resource 130 receives network packets and performs a variety of translations/operations on the network packets, such as forwarding, routing, encryption/decryption, authentication, and the like. Additional applications executing on the processing resource 130 can also be used to communicate with other processing resources (not shown in FIG. 1).

The processing resource 130 includes a bridging application 132. The bridging application 132 translates network packets from disparate media formats received from disparate netmods (e.g., 110 and/or 120). Each network packet received by the bridging application 132 includes metadata associated with the addressing particulars of each network packet. The metadata also includes Ethernet header data that is transmitted on top of the network data packets over the disparate media transmission channels.

The bridging application 132 inspects this metadata to strip the Ethernet header. The Ethernet header data allows the bridging application to associate the network packets with a standard intermediate media format. Moreover, once the network packets are associated with the intermediate format, and the next address locations for the network packets determined, then the bridging application 132 translates the network packets into a media format required of any destination (e.g., next address location) netmod (e.g., 110 and 120).

If the received network packet is in a first media format and is destined to be relayed to a netmod (e.g., 110 or 120) associated with a second media format, then the bridging application 132 uses the metadata information available for each media format and translates the received network packet to the second media format before relaying the network packet along to the appropriate netmod (e.g., 10 or 120) that is handling network traffic associated with the second media format. This is achieved by using the Ethernet header data to first translate the received network packet to Ethernet and then to the second media format.

In one embodiment, the bridging application 132 has access to a translation table that permits it to translate from an Ethernet media format to the desired media formats. The table includes row identifiers for metadata elements and column identifiers for the media formats. Each cell of the table includes the corresponding equivalent for a particular metadata element and a particular media format. For example, a metadata header element can be identified by indexing to a row in the table having an identifier associated with headers, such as "r-x," where r identifies a row entry and x identifies a specific metadata element. Moreover, the desired translation from Ethernet format to a desired second media format can be acquired by indexing the appropriate column "c-f" for the desired media format, where c represents a column entry and f is the desired media format.

For example if the originally received media format is FR and the desired media format is ATM, then the FR format is first translated to Ethernet using the Ethernet header transmitted on top of the packet in FR format. As one of ordinary skill in the art appreciates, a Frame Relay Access Device (FRAD) can be used to achieve the transmission of Ethernet on top of a FR transmission. Next, a single element of the Ethernet intermediate format is identified as a specific row entry "r-01" within the table, and by accessing the column identifier "c-ATM" associated the desired ATM format; a table cell is constructed by the tuple "r-01, c-ATM". The tuple provides the appropriate translation information to the bridging application 132 for translating the intermediate Ethernet format to ATM.

Thus, the bridging application 132 translates a network data packet from FR to ATM. Of course a variety of more complex translation can be required, such that the cells of the table process other applications in order to complete the translation from FR to ATM. All such translations are intended to fall within the scope of the present disclosure. Further, it is readily apparent that the bridging application 132 does not require a table for translations, since the logic to perform the translations can be embodied within the bridging application 132.

Thus, in some embodiments, the bridging application 132 can access a more complex table in order to perform the appropriate translations on the media formats, such as when metadata elements of one media format does not map directly (e.g., one to one relationship) to a like metadata element in another media format. In these cases, the cells of the table can include the appropriate translation instructions (e.g., pointers to other applications) or mappings, and the bridging application 132 is adapted to process or initiate these instructions or mappings.

Of course, the bridging application 132 need not include tables at all rather it can access software applications or software objects that assist in performing the appropriate media format translations. Moreover, in some cases, the bridging application 132 can access a plurality of translation tables each linked to one another for purposes of performing the appropriate translations between media formats. Thus, the bridging application need not, in all circumstances, first translate a received network packet to an intermediate Ethernet format. For example, parsing requirements for separating the different elements associated with the metadata of a particular media format can be initially acquired by indexing on the received media data format in order to acquire the appropriate parsing instructions for the received metadata. Furthermore, as one of ordinary skill in the art readily appreciates, the translation information included within any cell of a table can be a direct mapping or a pointer to another application that knows how to perform the appropriate translation to a desired format. In this way, the translation information can be more complex and used to execute additional applications. And, in some cases, the additional applications can reside on additional and separate processing resources from the one in which the bridging application 132 is executing.

Furthermore, in some embodiments, the bridging application 132 can be instantiated, designed, and/or configured from a Graphical User Interface (GUI) application interfaced to the processing resource 130. Thus, as more translations between disparate media formats are desired, the bridging application 132 can be configured to accommodate the translation. Moreover, the configuration can be dynamic, so that the bridging application 132 need not be recompiled and re-linked when modifications are made. This can be achieved by using dynamic objects that are dynamically bound to the bridging application 132, or in the cases where the bridging application 132 acquires translation information from a dynamically modifiable table.

Accordingly, network packets associated with disparate media formats are received from different netmods and relayed to a single processing resource 130 having access to a bridging application 132. The bridging application 132 provides a virtual bridge between the disparate media formats, by translating the media formats of the network packets, as needed, before relaying any translated network packet to an appropriate netmod (e.g., 110 or 120).

As is now apparent to one of ordinary skill in the art, the present embodiments of the bridging system 100 offers significant improvements over conventional techniques, since a single processing resource 130 can execute a bridging application 132, which acts as a single bridging domain for all network packets. The virtual bridging system 100 is, therefore, not hardwired (as what has been conventionally required), and the virtual bridging system 100 can be dynamically configured and modified to adjust to the changing network patterns and needs of a network.

Figure 2:
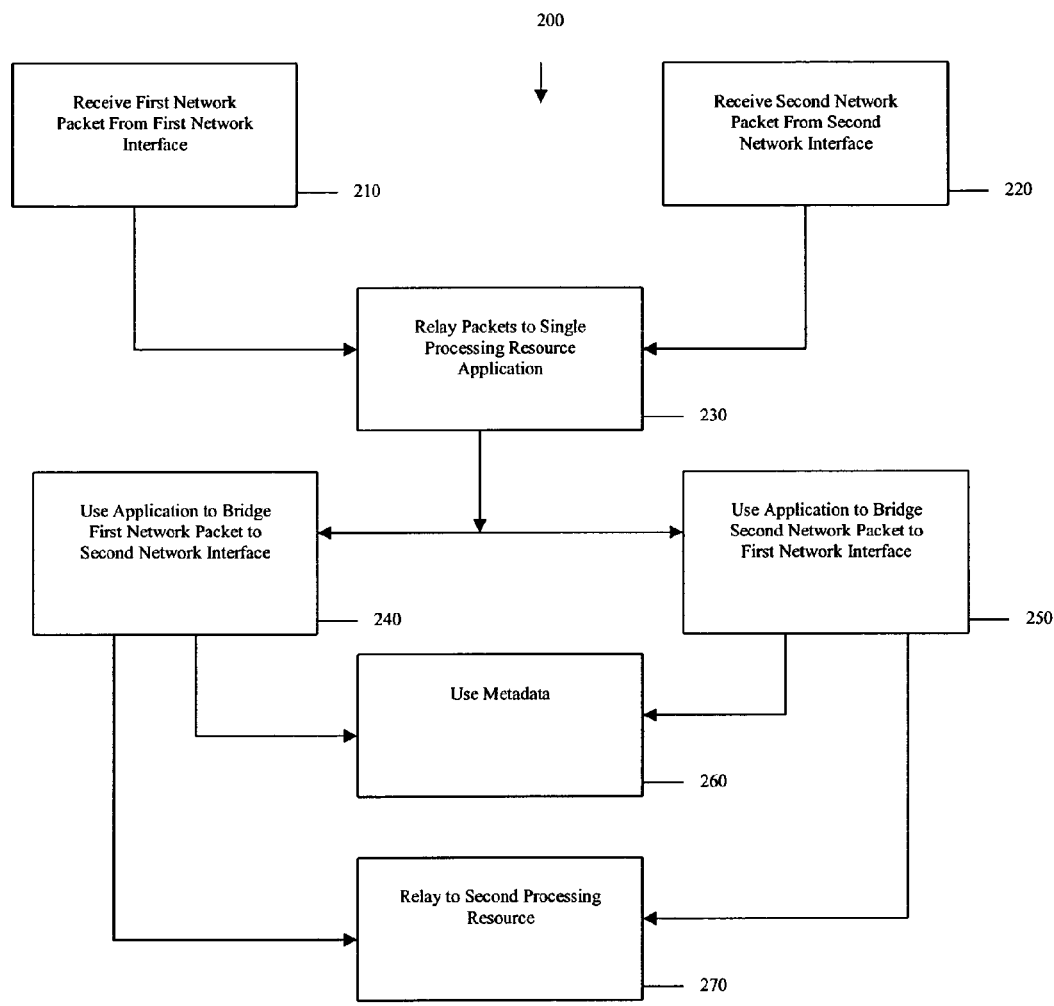
FIG. 2 shows a flow diagram of a method for bridging network packet media, according to the present invention.

FIG. 2 illustrates a flow diagram of a method 200 for bridging network packet media, according to the present invention. In one embodiment, of FIG. 2 the method 200 is implemented within a high-density server or blade server having a plurality of netmods, a switching fabric, and a plurality of processing resources. In other embodiments, the method 200 is implemented within any network router, network switch, or network-computing device. Each processing resource, can receive network packets from a number of the netmods, where each netmod is associated with a different media transmission channel and media format (e.g., ATM, GigE, TDM, FR, wireless, and the like). Of course, any configuration of computing devices implementing method 200 is intended to fall within the scope of the present disclosure.

In 210, a first netmod receives a first network packet from a first media channel, and, in 220, a second netmod receives a second network packet from a second media channel. Each network packet is in a data format associated with its respective media channel. The first and second netmods are designed to relay or steer the received network packets to a single processing resource, as depicted in 230. In some embodiments, the first and second packets also include Ethernet transmitted on top of its native media data format.

The processing resource includes a bridging application, which is processed when the packets are received by the processing resource. The bridging application can execute one or more instructions and/or access one or more tables (or any data structures) in order to bridge the first network packet to the second media channel, as depicted in 240. Additionally, the bridging application can execute one or more instructions and/or access one or more tables to bridge the second network packet to the first media transmission channel, as depicted in 250.

In some embodiments, and in 260, the bridging application inspects the network packets for addressing information or metadata information. The information associated with any received network packet is inspected to determine where the received network packet is to be relayed next. If the relay location is a netmod associated with a disparate media format and a disparate media channel from what the received network packet was originally received in, then the bridging application translates the received network packet to an intermediate Ethernet format by using the network packet's Ethernet header included with the network packet. The intermediate Ethernet format is then used to translate the network packet to a destination media format before relaying the network packet to the appropriate netmod. In some cases, this translation can entail converting only the metadata information associated with the network packet.

In some instances, the bridging application can determine, upon inspecting a received network packet, that to properly translate the received network packet, one or more transfers need to occur by relaying the network packet to a second application residing on a second processing resource, as depicted in 270. Alternatively, the bridging application can relay the received network packet to a second application executing on the same processing resource as the bridging application.

The bridging application is a virtual bridge between heterogeneous network packet media. In some embodiments, the bridging application can be dynamically instantiated, configured, and/or modified by using a GUI application interfaced to the processing resource. Thus, method 200 provides a virtual bridge from within a single processing resource to translate between disparate media formats and disparate media channels. This virtual bridge provides a single bridging domain for network packets of disparate media formats.

Figure 3:
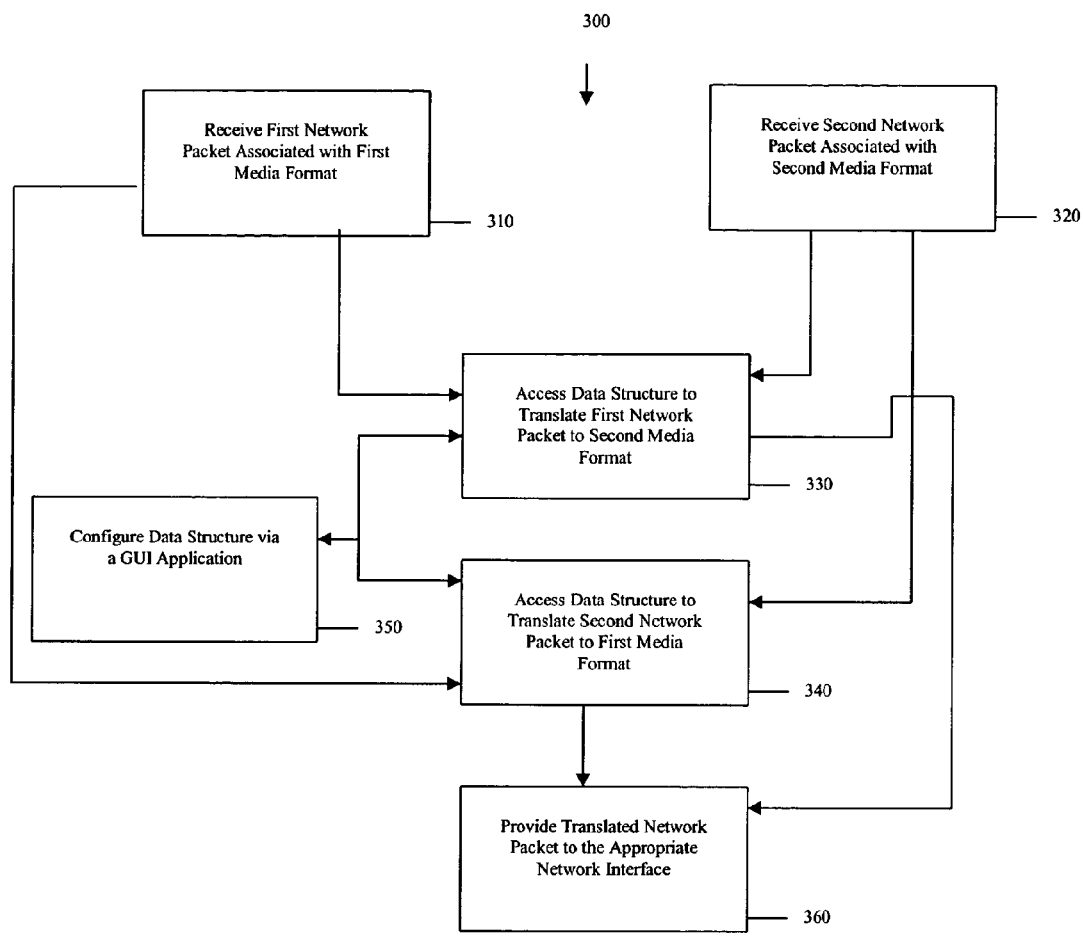
FIG. 3 shows a flow diagram of another method for bridging network packet media, according to the present invention.

FIG. 3 illustrates a flow diagram of another method 300 to bridge network packet media, according to the present invention. In some embodiments, the method 300 is implemented within a high-density or blade server. The blade server includes a plurality of network interfaces, a switching fabric, and a plurality of processing resources. Additionally, the method 300 can be implemented within any network router, network switch, or network-computing device. However, any configuration of computing devices implementing method 300 is intended to fall within the scope of the present disclosure.

In 310, a first network packet is received and is identified as being associated with a first media format (e.g., GigE, ATM, FR, TDM, wireless, or others). Additionally, in 320, a second network packet is received and is identified with a second media format. In some embodiments, the network packets are received from disparate netmods where each netmod is designed to relay and transmit network packets from and to a specific media transmission channel (e.g., GigE, ATM, FR, TDM, wireless, or others).

In 330, a translation data structure is accessed to translate the second network packet from the second media format to the first media format. Additionally, in some embodiments, and in 340, the translation data structure is accessed to translate the first network packet from the first media format to the second media format. In this way, the translation data structure acts as a virtual bridge between disparate media formats associated with the network packets. Further, in one embodiment, the first and second network packets are translated to Ethernet format before translation to a desired media format occurs. This can occur, when the network packets also include Ethernet transmitted on top of their native media formats.

In some embodiments, the translation data structure is configurable and instantiated within a single processing resource by using a GUI application interfaced to the processing resource and the translation data structure, as depicted in 350. The translation data structure can be one or more data structures (e.g., tables, lists, trees, and the like) logically linked together. Moreover, information within the translation data structure can permit the execution of instructions (e.g., pointers to other external applications) in order to assist with translation between heterogeneous media formats.

Moreover, in some cases, the translation data structure can be implemented within a bridging application that executes on a single processing resource, where the processing resource receives the network packets from a plurality of netmods associated with disparate or different media transmission channels and formats.

Once, the translation data structure is accessed to translate or bridge the disparate media formats, then, in 360, the translated network packet is provided to the appropriate netmod associated with the translated media format. Thus, the translation data structure is used as a virtual bridge between heterogeneous packet media. The translation data structure is dynamically configurable and modifiable to accommodate a plurality of media translations desired within a network.

Also, as one of ordinary skill in the art will readily appreciate, translation data structure is used on Layer 3 (e.g., network or IP layer), and is capable of linking the necessary metadata associated with addressing various media formats. Metadata includes header information and other information used in resolving network packet addresses. Disparate media formats can include disparate metadata. Conventional approaches resolve the disparate addressing between media formats by dedicating a single processing resource having applications that are used to translate the metadata for each media format. In the present invention, a single processing resource utilizes application(s) that accesses the translation data structure for received and translated network packets, in order to bridge heterogeneous packet media. Thus, in various embodiments of the present invention, a single bridging domain is provided for media bridging.

Figure 4:
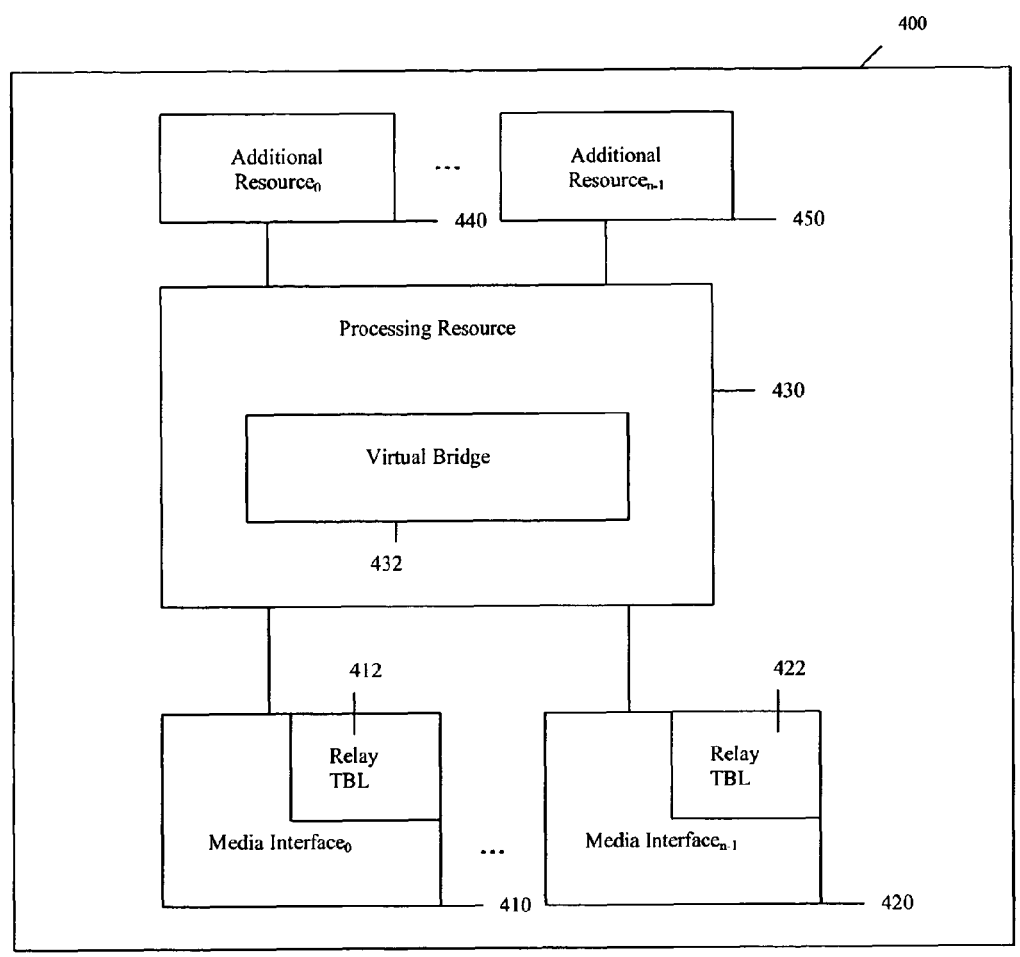
FIG. 4 shows a diagram of another network packet media bridging system, according to the present invention.

FIG. 4 illustrates a diagram of another network packet media bridging system 400, according to the present invention. The media bridging system 400 includes a plurality of netmods (e.g., 410 and 420), a relaying data structure (e.g., 412 and 422) for each netmod (e.g., 410 and 420), and a bridging application 432 that resides in a processing resource 430. The bridging system 400 can be implemented in a high-density or blade server. Alternatively, the bridging system 400 can be implemented in any network router, network switch, of network computing device. Of course, other configurations of computing devices that provide the media bridging of the present invention can also be implemented, without departing from the present invention.

Each netmod (e.g., 410 and 420) includes a plurality of line interface ports (not depicted in FIG. 4). The line interface ports accept network traffic from a telecommunications line (a transceiver when the network traffic is wireless). The netmods (e.g., 410 and 420) identify and select network packets from the network traffic occurring on the line interface ports. Each of the netmods (e.g., 410 and 420) is associated with different media channels (e.g., GigE, ATM, TDM, FR, wireless, and others).

The relaying data structures (e.g., 412 and 422) are accessed when network packets are identified by the netmods (e.g., 410 and 420). The relaying data structures (e.g., 412 and 422) permit the netmods (e.g., 410 and 420) to relay the network packets to the processing resource 430. The relaying data structures (e.g., 412 and 422) are dynamically configurable within the processing resource 430 and provided to the netmods (e.g., 410 and 420). In some embodiments, the relaying data structures (e.g., 412 and 422) are represented as SRAM tables within the netmods (e.g., 410 and 420). The SRAM tables (e.g., 412 and 422) can include identifiers for the processing resource 430, the netmods (e.g., 410 and 420), and identifiers for line interface ports (not depicted in FIG. 4).

When the network packets are relayed from the netmods (e.g., 410 and 420), they can include an Ethernet transmitted on top of the native media format. However, the metadata-addressing format of the network packets may still be in a format associated with the original media channel format.

The bridging application 432 receives the relayed network packets and detects the original media channel formats for the network packets based on metadata associated with the network packets. The bridging application 432 then translates a number of the network packets from a received media channel format to a requisite media channel format, based on where a particular network packet is to be relayed to next. Yet, as one of ordinary skill in the art readily recognizes, this translation can be done on an Ethernet format, when the network packets include Ethernet on top of their native media formats. Finally, the bridging application 432 translates any number of the network packets from the received media channel formats to requisite media channel formats. In this way, the bridging application 432 uses metadata associated with disparate media formats to bridge the network packets between heterogeneous media formats using traditional Ethernet, or any other intermediate media channel format transmitted on top of the network packets along with their native media formats.

In one embodiment, the bridging application 432 communicates with one or more additional processing resources (e.g., 440 and 450). The bridging application 432 can use these additional processing resources (e.g., 440 and 450) to assist in bridging between heterogeneous media formats. In this way, processing can be offloaded from the processing resource 430 to the additional processing resources (e.g., 440 and 450).

In some embodiments, the bridging application 432 is dynamically instantiated and configured through a GUI application communicating with the processing resource 430. The configurations can include parameters that identify the media formats that the bridging application 432 is capable and permissibly allowed to bridge. The bridging application 432 can be provided as an Application Programming Interface (API) library, or as an OO class object having public and private methods. The API can be provided as a Dynamic Linked Library (DLL) or a shared library. Of course, any implementation, including stand alone ad hoc implementations, of the bridging application 432 that is designed to bridge heterogeneous media formats from a single processing resource 430 is intended to fall within the scope of the present invention. Moreover, the bridging application 432 can use one or more tables or other data structures to bridge heterogeneous media formats.

CONCLUSION

Methods and systems detailed above packet media bridging in a network. These methods and systems create a single media bridge domain for use in network routing environments. In contrast, traditional approaches have relied on hardwired and static implementations of switches and media bridges, thereby creating a plurality of media bridging domains. Accordingly, the present invention permits better utilization and load balancing of an enterprise's network routing resources.

Furthermore, the virtual media bridges of the present invention are dynamically configurable to meet the changing needs of an enterprise's network traffic. In some embodiments, the configuration of the virtual bridges can be altered using a GUI application in communication with a processing resource. Moreover, the processing and memory capabilities of the processing resource can be published and made available within the GUI application. In this way, an enterprise can monitor and alter network traffic as needed with the teachings of the present invention, without the need to acquire additional hardware and software resources.

Although specific embodiments have been illustrated and described herein, it will be appreciated by one of ordinary skill in the art that any arrangement that is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A network routing/switching blade server comprising:
   a plurality of network modules, including:
      a first set of network modules implemented within a first server blade and operable to receive, via a first set of line interface ports, network packets having a first framing media format of a plurality of framing media formats; and
      a second set of network modules implemented within a second server blade and operable to transmit, via a second set of line interface ports, network packets having a second framing media format of the plurality of framing media formats;
   a plurality of processing resources implemented within one or more server blades coupled to the plurality of network modules and shared by the plurality of network modules, including a first processing resource upon which a virtual bridging application executes, the virtual bridging application representing a single bridging domain for all network packets received by the network routing/switching blade server;
   a non-transitory memory, accessible to the first processing resource, having stored therein one or more translation data structures defining translations between the first framing media format and an intermediate format and between the intermediate format and the second framing media format;
   a switching fabric server blade, coupled to the plurality of network modules, forwarding the network packets received from the first set of network modules to one or more of the plurality of processing resources;
   wherein responsive to receiving a network packet, the first set of network modules pass the network packet to the virtual bridging application through the switching fabric server blade;
   the virtual bridging application determines a relay location to which the network packet is to be relayed and whether the relay location is among the second set of network modules, which are associated with a disparate framing media format and a disparate media channel than that of the first set of network modules; and
   responsive to an affirmative determination that the relay location is among the second set of network modules, the virtual bridging application uses the one or more translation data structures to translate the network packet to the second framing media format before relaying the network packet to the relay location.

2. The network routing/switching blade server of claim 1, wherein the plurality of framing media formats include one or more of Asynchronous Transfer Mode (ATM), Gigabit Ethernet (GigE), Frame Relay (FR), Time-Division Multiplexing (TDM) and a wireless media format.

3. The network routing/switching blade server of claim 1, wherein the one or more translation data structures are dynamically configurable, thereby allowing the virtual bridging application to be dynamically configured to accommodate framing media translations desired to be performed by the network routing/switching blade server.

4. The network routing/switching blade server of claim 1, wherein the virtual bridging application relays the network packet to one or more other applications running on a second processing resource of the plurality of processing resources in order to assist in bridging between a first media channel associated with a first network module of the first set of network modules and a second media channel associated with a second network module in the second set of network modules.

5. The network routing/switching blade server of claim 4, wherein a first application running on the second processing resource performs one or more forwarding translations/operations, routing translations/operations, encryption/decryption translations/operations and authentication operations on the network packet.

6. The network routing/switching blade server of claim 1, wherein the virtual bridging application is dynamically instantiated, configured or modified using a graphical user interface application.

7. The network routing/switching blade server of claim 1, wherein the virtual bridging application is provided as an Application Programming Interface (API) library.

8. The network routing/switching blade server of claim 7, wherein the API is provided as one or more Dynamic Linked Libraries (DLLs).

9. The network routing/switching blade of claim 7, wherein the API is provided as a shared library.

10. The network routing/switching blade of claim 1, wherein the virtual bridging application is provided as an object-oriented class object having public and private methods.

11. The network routing/switching blade of claim 1, wherein the network packet comprises an Ethernet frame and the virtual bridging application permits media agnostic Ethernet bridging between the first set of network modules and the second set of network modules.

12. The network routing/switching blade of claim 1, wherein the one or more translation data structures include metadata associated with network packets encapsulated within a first plurality of media transmissions.

13. The network routing/switching blade of claim 12, wherein the metadata includes Ethernet header data that is transmitted on top of network packets encapsulated within a first plurality of media transmissions.

* * * * *